Oct. 22, 1963  A. H. CLEMENT  3,108,249
CORRELATION BY RANDOM TIME REFERENCE UTILIZATION
Filed Oct. 22, 1959  3 Sheets-Sheet 1

Alvin H. Clement
INVENTOR.

BY Wm. E. Ford
ATTORNEY

Oct. 22, 1963     A. H. CLEMENT     3,108,249
CORRELATION BY RANDOM TIME REFERENCE UTILIZATION
Filed Oct. 22, 1959     3 Sheets-Sheet 2

A   B   C   D   E

E   D   C   B   A

AUTO CORRELATION EXAMPLE

ENLARGED SCALE RETRO CORRELATION EXAMPLE

EXCESS LOW FREQUENCIES

EXCESS HIGH FREQUENCIES

EXCESS OF LOW AND HIGH FREQUENCIES
TOO FEW INTERMEDIATE FREQUENCIES

BALANCED (IDEAL) FREQUENCY DISTRIBUTION

*Alvin H. Clement*
INVENTOR.

BY *Wm. E. Ford*
ATTORNEY

Oct. 22, 1963 A. H. CLEMENT 3,108,249
CORRELATION BY RANDOM TIME REFERENCE UTILIZATION
Filed Oct. 22, 1959 3 Sheets-Sheet 3

INVENTOR.
BY Wm. E. Ford

United States Patent Office 3,108,249
Patented Oct. 22, 1963

3,108,249
CORRELATION BY RANDOM TIME
REFERENCE UTILIZATION
Alvin H. Clement, 6027 Ridgeway, Houston, Tex.
Filed Oct. 22, 1959, Ser. No. 847,933
16 Claims. (Cl. 340—15.5)

This invention relates to the analysis and computation of the correlation functions of a group of oscillatory functions of time, such as wave trains, which may be modulated by frequency, amplitude and time space, or which may be modulated by any two of such means of modulations acting simultaneously, or which may be modulated by all three of such means of modulation acting simultaneously, or the oscillatory function may remain in the steady state for considerable periods of time. Patents which may be used for comparison with certain features of the herein invention, but not for comparison with its elements of invention or with its inventive concepts, are made of record herein as U.S. Patent No. 2,676,206 to W. R. Bennett et al., issued April 20, 1954, for Computation and Display of Correlation; U.S. Patent No. 2,688,124 to W. E. N. Doty et al., issued August 31, 1954, for Method and Apparatus for Determining Travel Time of Signals; and U.S. Patent No. 2,808,577 to J. M. Crawford et al., issued October 1, 1957, for Method of and Apparatus for Determining the Travel Time of Signals. By way of definition it is pointed out that time space modulation, as hereinabove referred to, comprises a special form of time division multiplex, or time discrimination coding where the time spacing between pulses is varied. By further way of definition, the combination of use of the three above forms of modulation hereinabove described may be referred to as frequency, amplitude, time discrimination coding and abbreviated as FATDC.

Generally stated this invention is a method of measuring the travel time of events as in the seismic surveying problem, repeating the excitation input time series $(f_1t)$, with respect to the power contributing frequencies, two or more times within the travel time of a desired event, destroying fictitious correlations caused by repeating the input time series, computing the error or residual spectral misbalance, on both the input time series $(f_1t)$ and the output time series $(f_2t)$ by using and applying the output of the correlators to discriminator circuits which control variable filter functions on $(f_1t)$ and $(f_2t)$.

Also the relative randomness between selected programs is measured by a retro-correlator and serves as a measure of spectral dominance and relative disorganization between groups.

In usage it is essentially desired to employ this combination of modulations and equipment to measure time-travel and to correct for the variations in the transfer function for each of the reflection travel time paths encountered in the seismic sub-surface surveying problem. This problem is similar to sonar problems, acoustical well logging, and many others. In all such problems the matter of noise in the quantum of space of transmission medium becomes extremely prominent. The bandwidth of the transmission medium is in general limited for the power contributing frequencies.

This invention employs special steps in multiplexing a large number of signals through a noisy transmission medium which is limited as to bandwidth, such signals each being identified by frequency and time discrimination coding. The degree of correlation between unlike functions having similar spectral content is termed the erroneous cross-correlation, and on a short term basis may approach a magnitude which is a considerable percentage of the total power involved. In many cases for comparatively short periods of time it may actually be several hundred times larger than the desired signal. On the other hand, upon a long term basis, the residual correlation value becomes negligible or the erroneous cross-correlation approaches zero.

As a primary object the invention sets out to program the energy input $(f_1)$ into any quantum, space, or transmission medium which is noisy and limited as to bandwidth so that the auto-correlation function of the input $(f_1)$ will approach an impulse function as nearly as such may possibly be done within the limitations of the overall system.

It is a further and important object of this invention to program the energy input $(f_1)$ so that the cross-correlation of $(f_1)$ and $(f_2)$ will approach as nearly as possible within limitation of the overall system an approximate impulse function, $(f_2)$ in this case being $(f_1)$ as modified by transmission media and time varying filters.

Another such important object has to do with the employment of continuously variable filters in problems of this class in manner that such filters act upon $(f_1)$ and $(f_2)$ to cause the power spectra curves for the cross-correlation function for each travel path in a seismic surveying problem to approach a balanced configuration gently rising or descending without maxima or minima undulations.

It is also another object of this invention to program $(f_1)$ and $(f_2)$ in manner that the correlating equipment and program equipment is interlocked to automatically compensate recurrent errors to arrive at a final minimum error.

It is also another and further object to program $(f_1)$ and $(f_2)$ in correlating equipment of this class which includes retro-correlators, auto-correlators, and cross-correlators with correlator output being amplified and applied to appropriately provided discriminator circuits to be fed back into control elements for $(f_1)$ and $(f_2)$ filters whereby the cross-correlation thereof approaches an ideal impulse, and retro-correlation approaches zero.

It is yet another object of this invention to provide a program selector operative at predetermined FATDC selection to utilize the retro-correlator output and the auto-correlator output in manner to correct the original predetermined selections of FATDC terms whereby the system becomes completely self-governing in the programming of $(f_1)$, and selection of filtration for $f_1$ and $f_2$.

It is an additional object of the invention to measure travel time and variations in transfer functions in problems where strong noise overrides a low level signal as when the measuring instruments must be in motion or as when the system under measurement is in motion, as for example in acoustical well logging problems, in marine seismic studies, in medical studies on respiratory and circulatory systems in living organisms, and in a multiplicity of other scientifically related problems.

It is a further object of this invention to employ FATDC or portions thereof to measure low level signals buried in noise, as in the case of signals transmitted from underwater, or as in substantially silent, telegraphic apparatus, the signals being detected at remote points and correlation thereof with a known record being made and plotted, in such the signals being previously arranged in accordance with a simple code, for instance through this method the "sofar" layer, used in long range underwater triangulation practice can be used as a semi-private communication channel.

It is a further object of this invention to employ the well known forms of harmonic analysis on both the auto-correlation and on the cross-correlation function since from harmonic analyses it is possible to obtain the relative frequency response function, the relative transfer function, and relative amplitude ratio measurements, for reflecting interfaces whose separation in time is to small to be resolved by direct measurement.

Other and further objects will be apparent when the specification herein is considered in connection with the accompanying diagrams and mathematical and physical formulae interspersed therethrough, and in connection with the included drawings, in which.

Figure 13:
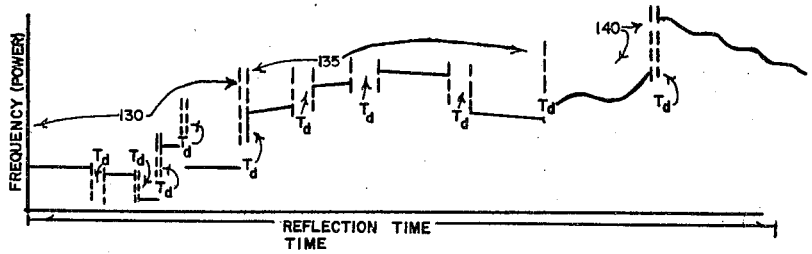
Figure 14:
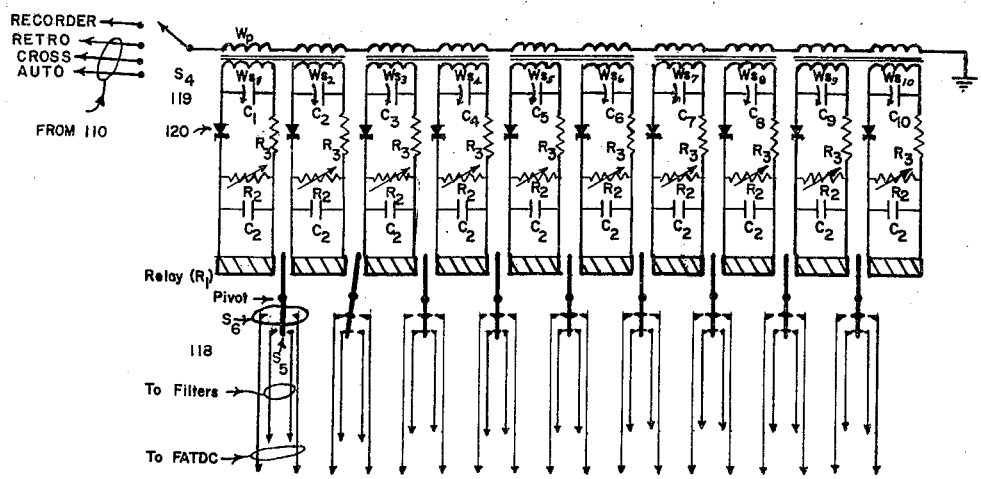

FIG. 13 is a graph illustrating near random step and sweep selection, together with repetitive steps; and FIG. 14 is a diagram of a bank of sharply tuned discriminators operating from an untuned transmission line which can be connected either to the auto-correlator, cross-correlator, retro-correlator, or the input time series at point of input to medium to be measured or at a point removed from such input point.

The actual mechanics and methods of computing correlation functions are well described in previous literature and will not be dealt with here.

The correlation function as described in engineering publications is designated by the following five formulae as set forth as follows:

$$\underline{4\text{-}1}\ \phi_{1,1} = \frac{1}{2T}\int_{-T}^{T}[f_1(t)][f_1(t+\gamma)]dt$$

which simplifies in engineering practice to the form:

$$\underline{4\text{-}2}\ \phi_{1,1} = \frac{1}{T}\int_{0}^{T}[f_1(t)][f_1(t+\gamma)]dt = \text{auto-correlation}$$

$$\underline{4\text{-}3}\ \phi_{1,2} = \frac{1}{T}\int_{0}^{T}[f_1(t)][f_2(t+\gamma)]dt = \text{cross-correlation}$$

$(f_1)$ and $(f_2)$ are random or non-random functions of time and may or may not be initially independent. In many cases, as in the example of the seismic surveying problem, $(f_2)$ is merely $(f_1)$ after modification by the transmission system.

$$\underline{4\text{-}4}\ \phi_{1,1} = \frac{1}{T}\int_{0}^{T}[^K f_1 t][^{KR} f_1(-t+\gamma)]dt$$

is the auto-correlation of a spectral set. The superscript in the formula K denotes a large number of functions, repetitive or non-repetitive, random or non-random, each of which may have been repeated many times within the ensemble.

$$\underline{4\text{-}5}\ ^R\phi_{1,1} = \frac{1}{T}\int_{0}^{T}[^K f_1(t)][^K f_1(t+\gamma)]dt$$

is a retro-correlation for large ensembles of functions and spaces.

Figure 7:
FIG. 7 is an image correlation of a positive sequential group correlated with a negative sequential group, (riser with a faller), retro correlation thus being shown by such graph.
Figure 8:
FIG. 8 is a graph illustrating a correlation function dominated by low frequency terms.
Figure 9:
FIG. 9 is a graph illustrating a correlation function dominated by high frequency terms.

It can be shown by long empirical means that as auto-correlation approaches an impulse of extreme sharpness, retro-correlation generally approaches zero. The retro-correlation is then actually the summation of all image correlations. It is an oscillatory event for a single frequency and equal to the auto-correlation of that event. Under certain conditions retro-correlation is a measure of a spectral group dominating or misbalancing the auto-correlation and cross-correlation (see FIGS. 7–9). It is easily computed by reversing a copy of $(f_1)$ in time and computing the reversed time track of $(f_1)$ against the forward track of $(f_1)$ simply as a cross-correlation while amplifying output and applying the output voltage to appropriate discriminator circuits.

The tuned discriminator circuits actuate filter selection control elements. It is important in final correlated wavelet that balance is approached for all frequencies. Heretofore, in direct pulse generating systems of time travel measurement and also in unidirectional sweep correlation systems, the selection of filter functions has been made manually and were based on experience factors and seldom if ever approached the optimium value. In short, the retro-correlation function, amplified many times, if approaching zero, or background noise level of equipment, is indicative of near ideal filtration and programming selection. If it is not near zero and has a characteristic frequency, this frequency is indicative of the dominant frequencies and can be applied to discriminator circuits which control the time variable filters and which in turn correct auto-correlation and cross-correlation toward proper balance as well as actuating frequency selective elements in the program selector.

Figure 6:
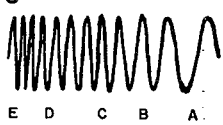
FIG. 6 is a sequential frequency set, identical to FIG. 4 but inverted in direction of taper.
Figure 5:
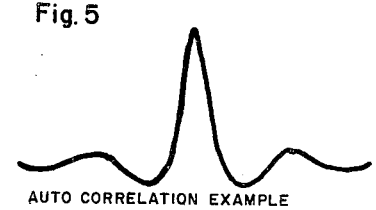
FIG. 5 is a specimen of auto correlation function of a spectral set, such as illustrated in FIG. 4.

The term image correlation is a retro-correlation on a short term basis. It is also used to denote the correlation of a spectral group $a$–$e$ with a spectral group $e$–$a$. See FIGS. 4 and 6. Such groups are generally called respectively risers and fallers.

In Equation 4–2 $(f_1)$ may equal a spectral set composed of five octaves, listed against corresponding cycles per second as follows:

$a = 5$–$10$ c.p.s.
$b = 10$–$20$ c.p.s.
$c = 20$–$40$ c.p.s.
$d = 40$–$80$ c.p.s.
$e = 80$–$160$ c.p.s.

Any member of the set can be varied at any rate from high to low and from low to high, any reasonable amplitude function can be applied. The set $a$, $b$, $c$, $d$, $e$ has 5! (factorial) or 120 arrangements. Each member of the set can be divided practically into a small number of equal parts, each part can be transmitted as a constant frequency for short periods of time, or part can be slowly varied in frequency.

Each member of the set can be divided practically by a small number, a fractional part of a member can be intermixed with other fractional parts of other members, and any fractional part or complete member or complete set can be repeated with respect to the power contributing frequencies within the travel time of a desired event in the seismic reflection problem.

By ordered stepping from any selected frequency to another selected frequency, it is possible to use removed correlation in place of adjacent correlation. The explanation of this is as follows: In unidirectional sweep taper programming of signals a desired event is always being correlated in close proximity to a powerful noise, the adjacent spectral portions of the sweep. By step selection of frequencies it is possible to correlate any given reflection time, selected within rough limits, say plus or minus .3 second, so that reflections are always being correlated ½ octave or more removed from any interfering frequency. This is similar to the problem of separating two closely spaced frequencies with filters. It is easy to separate two frequencies if they are one octave or more removed from each other. It is much more difficult to separate a frequency of, say, 29 cycles per second from a frequency of 30 cycles per second. Removed correlation is more efficient than adjacent correlation on short term basis. This can be shown easily by lengthy computations.

By ordered stepping and random or ordered selection of spaces and frequencies it is possible to record continuously over long periods of time, with no dead time on the recording medium, or programming of energy. Energy is being programmed continuously to the system under investigation.

The stepping through process or ordered or random selection of power contributing frequencies can be simply explained by comparing to a musical band of eight rows, 1, 3, 5, and 7 walking forward, rows 2, 4, 6 and 8 walking opposite, both rows reversing just as end members coincide, thus each member keeps walking but the band never goes anywhere. The purpose of this arrangement is to make the process continuous within the time limitations on the recording medium.

Figure 4:
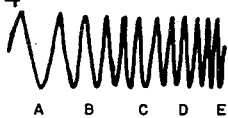
FIG. 4 is a graph illustrating a sequential frequency graph, together with designations for the various spectral members of the set.

For a modulated function $a-e$ as shown in FIG. 4, it is obvious that the auto-correlation thereof approaches a sharp maximum. Also it is obvious that the cross-correlation of $a-e$ will not maximize with $e-a$. But actually each spectral set does correlate, but each fractional portion of the set correlates relative to a random reference in time, and are not additive. It is obvious that in case of a spectral member being dominant, that there will be a residual or error centering about the dominant frequency. In this regard it should also be noted in FIG. 4 that $a-e$ will cross-correlate with $e-a$ but the cross-correlation will be much less than the auto-correlation of $a-e$ or $e-a$.

As to the cross-correlation of $a-e$ with $e-a$, such cross-correlation tends to drop to a low value, the maximum portions thereof being indicative of the averaged dominant frequencies, while the minimum portions thereof tend to drop below the inherent noise of the system.

The use of the randomized reference is further applied to eliminate fictitious correlations or simply fiction caused by repeating twice or more the input time series with respect to the power contributing frequencies within the travel time of a desired reflection in a seismic surveying problem. The desirability of repeating the input time series is to maximize the number of samples per unit of recording time within the band width limits of the transmission medium and within the performance limitations of the energy programming equipment, while at the same time there should be maintained a maximum ratio of discreteness or sharpness in the final correlated wavelet.

The fictitious wavelets are easily subjected to inverse filtration by simply shifting the time space between the power contributing groups which are to be repeated by N in cases where N equals any odd number of ½ periods for correlation function of the group to be repeated. This can actually be shifted at almost any semi-randomized selection.

In any system involving analogue simulator methods, the problem of making accurate measurements is paramount, both in regard to minimizing mechanical errors and also errors in programming of the exciting signals to the medium to be measured. It is extremely desirable that the overall system be entirely self-correcting and that no type of error becomes systematic. By feeding back the output of the retro-correlator to filter actuation elements on $(f_1)$ and $(f_2)$, under certain restrictions the programing errors are randomized and are non-additive. These restrictions can be computed concurrently by analog or digital computers, or they can be taken from previous computations and stored on cams, magnetic tape, et cetera.

Figure 10:
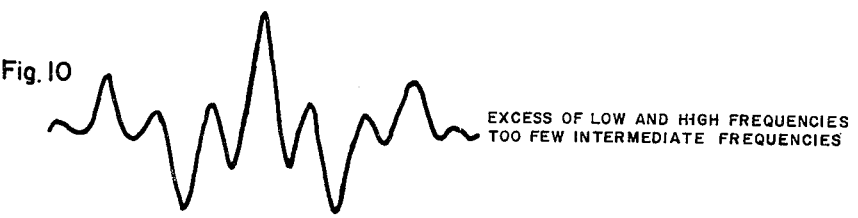
FIG. 10 is a graph illustrating a correlation function with a chopped or gapped spectrum, there being too much of low frequencies and too much of high frequencies, and too few intermediate frequencies.
Figure 11:
FIG. 11 is a graph illustrating a correlation function with substantially ideal or balanced characteristics.

Referring now to FIG. 11, there is illustrated a graph of a correlation function whose characteristics are near ideal, its spectrum being balanced and represents several octaves of band width. It is toward this ideal characteristic and the elimination and minimization of the types illustrated in FIGS. 8, 9, and 10 that the primary purposes of this invention are directed.

Figure 1:
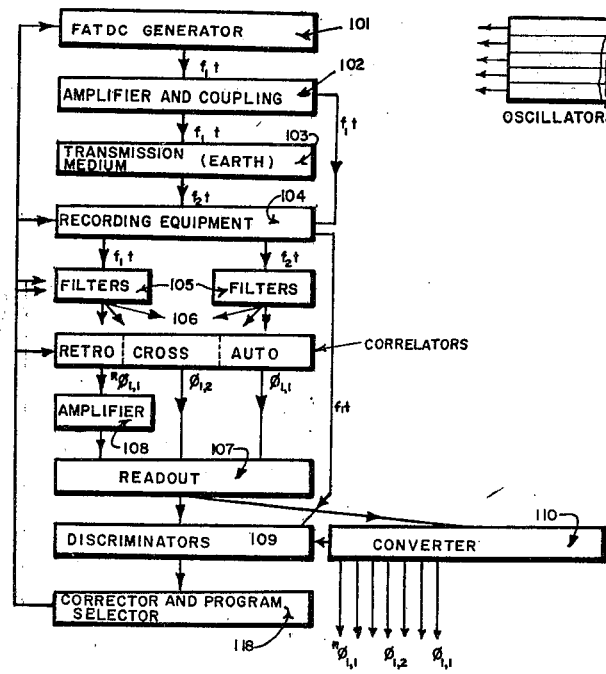
FIG. 1 is a block diagram showing various elements of equipment and apparatus for practicing the invention, the diagram including both equipment logically maintained at a central location or office, and service equipment necessarily operated in the field.

Making reference to FIG. 1, there is shown a block schematic diagram of the complete layout of equipment necessary to practice this invention. The FATDC generator 101 shown generally in FIG. 1, is shown in expanded form in FIG. 2. The generator consists of a plurality of oscillators, in this case, one for each octave of band width, each of which overlaps to some extent into the adjacent octave. The output of each oscillator is fed to a point on a multiple switch $S_1$ which in this case is a five position switch whose common point is connected to a telegraph keyer $S_2$ which is opened and closed on a preconceived arrangement, either manually or on instructions from the corrector and program selector. The telegraph keyer $S_2$ connects to a multiple position switch $S_3$ which is an amplitude selector on a small conventional buffer amplifier which in turn drives the main amplifier 102 which is of any conventional type. The amplifier 102 is coupled to the transmission medium 103 to be examined and a copy of $f_{1t}$ is picked up at point of energy input and recorded on the recording medium 104.

Filters 105 are normally built internally of the recording amplifiers and the correlator amplifiers. Such filters 105 are either voltage or current sensitive on the control elements. Optionally these filters may be set manually. The correlator 106 which performs the functions of retro-, cross-, and auto-correlators, can be of any type which can perform the processes of retro-, cross-, and auto-correlation. An example of such correlator is shown and described ni U.S. Patent No. 2,643,819 to Yuk Wing Lee et al. and also in U.S. Patent No. 2,676,206 to Bennett et al., mentioned hereinabove.

From the correlator the retro-correlation passes to an amplifier 108 to be magnified and thence to the readout 107 while the cross- and auto-correlation from correlator pass directly to the readout 107. The readout 107 on the correlator is of any conventional type, capable of sampling the value of correlation and giving an appropriate indication thereof. The amplifier 108 is a conventional amplifier designed to build up the normally low level output of the retro-correlator to compare with the output of the cross- and auto-correlators. Such a readout is described in Analysis of Sampled Data System, by J. R. Ragazinni and L. A. Zadeh, in the Proceedings of Institute of Radio Engineers, volume 40, pages 225–234, November 1952.

The converter 110 is of any conventional type compatible with the readout, its function being that of converting readout output to suitable form.

The discriminator assembly 109 is a bank of phase shift discriminators or ratio detectors whose inputs consist of staggered tuned resonant circuits. Each discriminator input covers a selected frequency bank of one or more octaves, such being compatible with the FATDC generator. The output of each discriminator is rectified and integrated over a considerable period of time and is applied to multiple position, polarized relays which actuate program selector relays which in turn control the FATDC generator and actuates filter selectors in recording equipment and the time variable filters 105 on $f_1t$ and $f_2t$.

Figure 3:
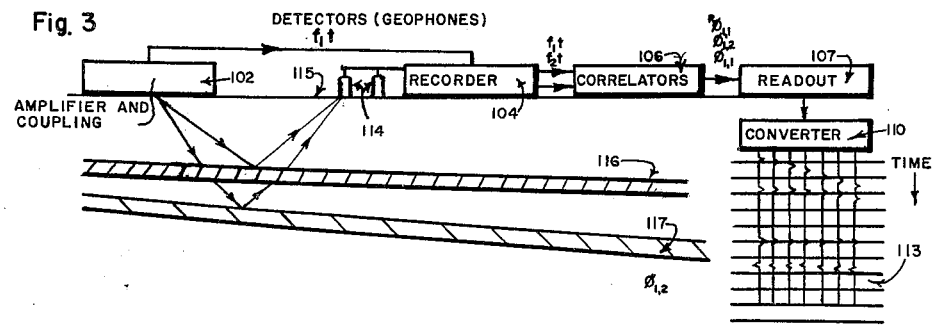
FIG. 3 is a diagram of the equipment as would be set up in the field illustrating necessary components for obtaining correlation functions which are indicative of travel time, together with a representative correlogram of a specimen problem.

FIG. 3 is a diagram of the equipment as would be set up in actual practice in measuring the travel time of reflected events. The detectors which are part of the recording equipment are shown as 114. The actual record is at 113, in which travel time is plotted against depth. In such arrangement the amplifier 102 and recorder 104 are set up on the earth's surface 115, together with the detectors 114 whereas the correlators 106, readout 107, and converter 110 may be located at a central station, or optionally in the field as may be desired. With the amplifier 102, detectors 114, and recorder 104 thus in position on the earth's surface, as shown in FIG. 3, sound rays from the amplifier 102 are emanated to be reflected back from the various geological strata 116, 117 to be recorded.

Referring now to FIG. 14, the discriminator assembly 109 is shown as including a bank of tuned discriminators 119. Each tuned discriminator 119 acts as a tuned wave trap, the output of which is rectified by a conventional rectifier 120 and integrated by a conventional circuit in which a condenser $C_2$ is the integrator element and a resistance $R_3$ serves as the stabilizer, an auxiliary variable bleeder resistance $R_2$ being provided in circuit parallel to condenser $C_2$.

In operation signals may arrive selectively from the recorder 104 to a bank 125 of discriminators 119 tuned therefor, or arrive selectively from the retro-, cross-, or auto-correlator portions of the correlator 106 to banks 125 of discriminators 119 respectively tuned therefor. In FIG. 14, a switch $S_4$ is shown as designating the means for electrically connecting any bank 125 to the respective source from which its discriminators are tuned to receive signals. In each of such cases an untuned primary transformer winding $W_p$ receives the respective signals which are transformed through secondary windings $WS_1$, $WS_2$, $WS_3$, et cetera, for successive stagger tuned discriminators 119. Each discriminator 119 is thus tuned to an appropriate spectral group by a variable condenser $C_1$ or by other conventional tuning means.

The condenser $C_2$ in each discriminator 119 is in parallel circuit with a relay primary $R_1$ whose movable arm is common to an adjacent relay $R_1$ of similar characteristics whose input is operating off the adjacent discriminator. As long as the integrated output of each discriminator is balanced by its adjacent neighbor, the relays remain in neutral position. When misbalance occurs the relay arms are moved and in turn actuate a conventional filter selection control on the FATDC programmer or on the time variable filter controls or both. When the output of all integrators are approximately equal, the power spectrum of the function under measurement is approximately balanced within the limits of the system.

As shown diagrammatically in FIG. 14, the actuation of filter selection control is accomplished by a magnetic switch $S_5$ pivotally positioned for actuation by adjacent relays $R_1$ so that when the power output of a discriminator 119 exceeds a predetermined differential over the power output of an adjacent discriminator, the switches $S_5$ at either end of such discriminator 119, and comprised in the corrector part of the corrector and program selector 118, will be drawn to the respective relay $R_1$ thereof, whereas oppositely the switches will be shifted to close circuit leading to a filter or corrector selector corresponding within the recording equipment 104, the filters 105, and the correlator 106, taken singly or in combination.

Figure 2:
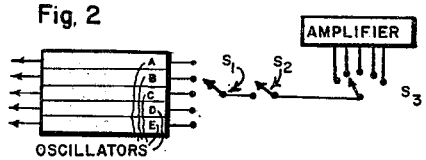
FIG. 2 is a view listing in detail the component elements of the FATDC generator shown generally in FIG. 1, the view also showing the connections to the corrector and program selector.

Also as shown diagrammatically in FIG. 14, switches $S_6$ pivotally positioned for actuation by adjacent relays $R_1$ may be correspondingly drawn to the respective relay of the excessively powered relay $R_1$, while oppositely such switches will be shifted to close circuit leading to switches $S_2$ and/or $S_1$ as shown in FIG. 2, such FIG. 2 showing details of the FADTC generator 101, as hereinabove described. Thus the corresponding oscillator A, B, C, D, or E is selected by operation of the switch $S_1$ whereby a desired frequency group is selected which can in turn be interrupted at will by manual operation of the switch $S_6$, or by its actuation by the relays $R_1$ adjacent thereto.

Figure 12:
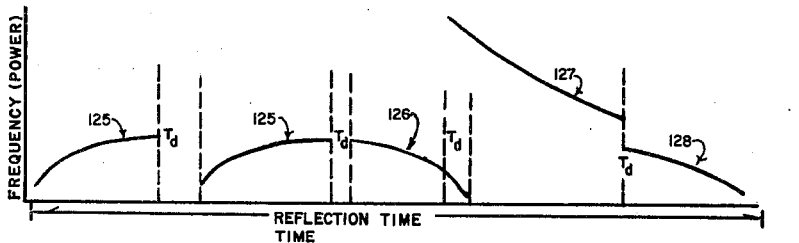
FIG. 12 is a time versus frequency graph illustrating the repetition of a complete sweep or sequence of frequencies, together with duplicating functions (two frequencies being simultaneously generated)

As shown in FIGS. 12 and 13, plots of frequency versus time are shown for various functions which are representative output signals of the FATDC generator. FIG. 12 shows a function 125, an interruptive time interval $T_d$ according to a preconceived coding plan, and a repeated function 125 thereafter. There follows an interrupted time interval $T_c$ of different duration than $T_d$, a function 126 which is a mirror image of, or oppositely directed from the functions 125. Thereafter a function 127 is shown overlapping the function 126 for a time interval $t_0$, such function 127 extending to a minimized interrupted time interval $T_x$ approaching zero, and such interval $T_x$ being followed by another function 128.

The overlapping condition represented by the function 127 overlapping 126 may be undesirable, but can be remedied by correction through the program selector 118.

FIG. 13 shows a group of functions 130 which are in substantially steady state with time interval of various durations thereinbetween. Also a group of functions 135 is shown with a substantially linear increase or decrease in frequency and with intervening time interruptions in between which are of various duration. Also a pair of functions 140 are shown of undulating or "modulated" character. These functions shown in FIG. 13 are further illustrative of types of signal forms which can be encoded and transmitted by the methods and structure of this invention.

The invention is not limited to the equipment hereinabove described, nor to the method steps set forth, but other equipment and other method steps are considered as well as such may fall within the broad spirit of the invention and within the broad scope of interpretation claimed for, and merited by the appended claims.

What is claimed is:

1. A method of programing signals to a medium to measure travel time to and from reflecting, refracting interfaces, comprising the steps of encoding, transmitting to the medium and recording the signals thus encoded and transmitted, recording the reflected signals, and measuring the correlation of the reflected signals with the transmitted signals by means of auto-correlation and cross-correlation and measuring the lack of correlation of the transmitted signals with the reflected signals by means of retro-correlation.

2. A method of programing signals to a medium to measure travel time to and from reflecting interfaces, comprising the steps of encoding signals after a time spacing pattern, transmitting to the medium and recording the signals thus encoded and transmitted, recording the reflected, refracted signals, and measuring the correlation of the reflected signals with the transmitted signals by means of auto-correlation and cross-correlation and measuring the lack of correlation of the transmitted signals with the reflected signals by means of retro-correlation.

3. A method of programing signals to a medium to measure travel time to and from reflecting interfaces, comprising the steps of encoding signals after a frequency modulated pattern, transmitting to the medium and recording the signals thus encoded and transmitted, recording the reflected, refracted signals, and measuring the correlation of the reflected signals with the transmitted signals by means of auto-correlation and cross-correlation and measuring the lack of correlation of the transmitted signals with the reflected signals by means of retro-correlation.

4. A method of programing signals to a medium to measure travel time to and from reflecting interfaces, comprising the steps of encoding signals after an amplitude modulated pattern, transmitting to the medium and recording the signals thus encoded and transmitted, recording the reflected, refracted signals, and measuring the correlation of the reflected signals with the transmitted signals by means of auto-correlation and cross-correlation and measuring the lack of correlation of the transmitted signals with the reflected signals by means of retro-correlation.

5. A method of programing signals to a medium to measure travel time to and from reflecting interfaces, comprising the steps of encoding signals emanated in accordance with at least one of a time spacing pattern, a frequency modulated pattern, and an amplitude modulated pattern, transmitting to the medium and recording the signals thus encoded and transmitted, recording the reflected, refracted signals, and measuring the correlation of the reflected signals with the transmitted signals by means of auto-correlation and cross-correlation and measuring the lack of correlation of the transmitted signals with the reflected signals by means of retro-correlation.

6. A method of programing signals to a medium to measure travel time to and from reflecting interfaces, comprising the steps of encoding signals emanated in accordance with at least two of a time spacing pattern, a frequency modulated pattern, and an amplitude modulated pattern, transmitting to the medium and recording the signals thus encoded and transmitted, recording the reflected, refracted signals, and measuring the correlation of the reflected signals with the transmitted signals by means of auto-correlation and cross-correlation and measuring the lack of correlation of the transmitted signals with the reflected signals by means of retro-correlation.

7. A method of programing signals to a medium to measure travel time to and from reflecting interfaces, comprising the steps of encoding signals emanated in accordance with a combination pattern derived from a time spacing pattern, a frequency modulated pattern, and an amplitude modulated pattern, transmitting to the medium and recording the signals thus encoded and transmitted, recording the reflected, refracted signals, and measuring the correlation of the reflected signals with the transmitted signals by means of auto-correlation and cross-correlation and measuring the lack of correlation of the transmitted signals with the reflected signals by means of retro-correlation.

8. A method of pragraming signals to a medium to measure travel time to and from reflecting interfaces, comprising the steps of encoding a plurality of repeated signals in accordance with a pattern of predetermined, spaced apart, power contributing frequencies, transmitting to the medium and recording the signals thus encoded and transmitted, recording the reflected, refracted signals, and measuring the correlation of the reflected signals with the transmitted signals by means of auto-correlation and cross-correlation and measuring the lack of correlation of the transmitted signals with the reflected signals by means of retro-correlation.

9. A method of programing signals to a medium to measure travel time to and from reflecting interfaces, comprising the steps of encoding a plurality of repeated signals in accordance with a pattern of predetermined, spaced apart, power contributing frequencies, transmitting to the medium and recording the signals thus encoded and transmitted, recording the reflected, refracted signals, measuring the correlation of the reflected signals with the transmitted signals by means of auto-correlation and cross-correlation and measuring the lack of correlation of the transmitted signals with the reflected signals by means of retro-correlation, and acting on such correlation to alter such pattern to minimize fictitious leading and trailing correlations.

10. A method of measuring the travel time of signals set in motion from substantially the earth's surface to travel downwardly to a reflecting surface and then back to the earth's surface, comprising the steps of transmitting an input signal from substantially the earth's surface while providing a counterpart thereof, the input signal travelling downwardly to be reflected by such surface to be returned in degree to substantially the earth's surface, recurving the return portion of such signal, and measuring the correlation of the reflected signals with the transmitted signals by means of auto-correlation and cross-correlation and measuring the lack of correlation of the transmitted signals with the reflected signals by means of retro-correlation.

11. A method of measuring the travel time of signals set in motion from substantially the earth's surface to travel downwardly to a reflecting surface and then back to the earth's surface, comprising the steps of transmitting input signals at a plurality of frequencies from substantially the earth's surface while providing a counterpart thereof, the input signals traveling downwardly to be reflected by such surface to be returned in degree to substantially the earth's surface, receiving any returning portions of such signals, and measuring the correlation of the reflected signals with the transmitted signals by means of auto-correlation and cross-correlation and measuring the lack of correlation of the transmitted signals with the reflected signals by means of retro-correlation to thereby determine the power distribution of the received frequencies over the power spectral range, and providing means to compensate automatically for power spectral deficiency between adjacent ranges of frequencies.

12. A method of using a retro-correlator to arrive at an approximation of the power spectra of the dominant group of a suite of signals, comprising the steps of amplifying the output of the retrocorrelator applying it to appropriate discriminator circuits, rectifying the output, measuring the lack of correlation of the output by integrating it and applying a differential power to appropriate control devices to operate a frequency-amplitude-time discriminating coder and to actuate time variable filter controls.

13. A method of using a retro-correlator by applying it to measure the lack of correlation between a plurality of suites of signals, comprising the steps of amplifying the output of the retro-correlator, applying it to appropriate discriminator circuits, rectifying and integrating the output and applying a differential power to appropriate control devices to maximize the discrimination between the suites of signals.

14. Apparatus for correlating time-frequency measurement by random reference utilization and comprising a frequency-amplitude-time discrimination coder including a series of oscillators each operative within a predetermined frequency range, amplifier means to amplify the oscillator output, a transmission medium, means to couple the amplifier means to the transmission medium, recording means to record signals reflected from the transmission medium, retro-correlators, cross-correlators, and auto-correlators with filters attached to filter the recorded signals, a second amplifier to amplify the retro-correlator output, a readout to plot sampled points of cross-correlator, auto-correlator, and amplified retro-correlator output signals, a converter to convert such points to plot as sine waves, a bank of sharply tuned discriminator circuits adapted to slice the power spectrum into definite discrete overlapping intervals and including means for rectifying and integrating the power frequencies so that power differentials between spectral groups can operate filter and program selector control elements which govern the output of said coder.

15. In combination with a retro-correlator, an auto-correlator, a cross-correlator, a retro-correlator amplifier, a read-out to receive auto-correlator, cross-correlator, and amplified retro-correlator output, and a frequency-amplified-time discrimination coder including a selection corrector and program selector, an untuned primary transmission line having a plurality of primary windings in series therein, a bank of discriminators comprising at least two output circuits and a switch operable to shift circuits, each output circuit comprising at one end a secondary winding and an electrical connector making transformer completion with an adjacent primary winding, each output circuit also having a condenser cooperative with said secondary winding to complete a tuned secondary, a rectifier, a resistor, a condenser cooperative with said resistor to comprise an integrator-averager, a variable resistor to bleed the charge on said condenser, and a relay, whereby power differences between spectral groups of signals arriving via said primaries to adjacent output circuits operate to shift said switch to shift circuits to actuate control devices to reduce said power differences, said selection corrector and program selector to correct the previously selected frequency-amplitude-time discrimination coder output series.

16. The method of correlating a series of transmitted signals comprising the steps of computing the auto-correlation of an input time series of signals, computing on a current basis the retro-correlation of the same input time series of signals, deriving the ratios between the computed auto-correlation and retro-correlation, and employing the derived ratios to control the action of an input code-programmer.

References Cited in the file of this patent
UNITED STATES PATENTS

| | | |
|---|---|---|
| 2,688,124 | Doty | Aug. 31, 1954 |
| 2,897,351 | Melton | July 28, 1959 |